United States Patent [19]

Streets et al.

[11] 3,865,052

[45] Feb. 11, 1975

[54] CHARCOAL STARTER DEVICE

[76] Inventors: Charles E. Streets, 508 N. 68th East Ave., Tulsa, Okla. 74136; Robert S. Hembree, 1420 S. New Haven, Tulsa, Okla. 74112

[22] Filed: Oct. 15, 1973

[21] Appl. No.: 406,587

[52] U.S. Cl. .............................. 110/1 F, 126/25 B
[51] Int. Cl. ............................................ F23b 3/00
[58] Field of Search .................. 126/25 B; 110/1 F

[56] References Cited
UNITED STATES PATENTS

| | | | |
|---|---|---|---|
| 3,060,868 | 10/1962 | MacLachlan | 126/25 |
| 3,062,200 | 11/1962 | Miller | 126/25 |
| 3,192,918 | 7/1965 | Ridgway | 126/25 |
| 3,734,034 | 5/1973 | Fowler | 126/25 |

FOREIGN PATENTS OR APPLICATIONS 660,408   4/1963   Canada ................................ 126/25

*Primary Examiner*—Kenneth W. Sprague
*Attorney, Agent, or Firm*—Head & Johnson

[57] ABSTRACT

A charcoal starter device for kindling untreated charcoal briquettes and comprising a kindling container for receiving kindling material and charcoal briquettes therein. An air inlet means is provided at the bottom of the kindling container and a removable elongated chimney or flue is placed on top of the container for facilitating the creation of an air draft upwardly through the container. The chimney is also removable to facilitate periodic inspection of the charcoal briquettes during the igniting process.

6 Claims, 3 Drawing Figures

PATENTED FEB 11 1975 3,865,052

3,865,052

CHARCOAL STARTER DEVICE

BACKGROUND OF THE INVENTION

1. Field of the Invention

This invention relates to charcoal starting devices and more particularly, but not by way of limitation to a charcoal starting device for igniting untreated charcoal briquettes and even more particularly, but not by way of limitation, to a device for containing the charcoals in a bunched group during the ignition process for facilitating heat transfer between the briquettes while providing an efficient draft system for the introduction of sufficient oxygen to sustain the ignition of the briquettes.

2. Background of the Invention

Heretofore, charcoal starting devices have consisted of electrical heating devices which are inefficient and costly to operate and which require a substantial amount of time to create a bed of coals sufficient to cook thereby. Other devices for facilitating the ignition of charcoal briquettes are similar to that as taught in the patent to Knight, U.S. Pat. No. 3,112,716, issued in 1963 and entitled FIRE STARTER FOR OUTSIDE GRILLS wherein a removable rack is placed inside a container for holding the briquettes while a fire is ignited thereunder to start the said briquettes burning. Subsequently, it was either required that the grill be removed to allow the burning briquettes to fall into the pan or charcoal grill or to turn the entire device over to pour the lighted charcoal briquettes into the grill itself. Ths device has several disadvantages, not the least of which is the depositing of the charcoals in the grill after ignition thereof. Since most outside charcoal apparatus are made of metal, the removable grill mechanism would often rust up and become unusable as was originally intended. Further, it was difficult, if not impossible, to periodically check the progress of the burning coals due to the basic construction of the apparatus. Another attempted solution to the problem is provided in the patent to Ridgway U.S. Pat. No. 3,192,918, issued in 1965 and entitled CHARCOAL STARTING ARRANGEMENT FOR A HOME-STYLE BARBEQUE GRILL. The Ridgway device taught the use of an elongated chimney for creating a draft over the igniting coals, which was an advancement over that of Knight in creating a draft through and around the charcoals. However, the lower end of the Ridgway chimney was provided with a flange type device that fits out over the charcoals which were spread out in the pan or grill and an ignition fuel was poured around the outer periphery of the flange in hopes that a flame ignited therearound would be pulled inwardly by the draft created by the chimney in order to start the charcoals. However, this system requires a large amount of fuel be used, plus the fact that in order to sustain the flame for a sufficient amount of time for the briquettes to be lighted, it would be necessary to surround the outer periphery of the flange with some combustible material such as paper or the like. Further, the construction of the Ridgway device made it practically impossible to check the progress of the coals without completely stopping the draft of air throughout and around the coals.

SUMMARY OF THE INVENTION

The present invention is particularly designed and constructed for overcoming the above disadvantages of providing a simple and efficient mechanism for kindling charcoal briquettes prior to the use thereof for cooking. Since one of the secrets in rapid ignition of charcoal briquettes is that of closely grouping the briquettes into a pile so that each briquette may benefit from the heat being generated from an adjacent burning briquette. It is well known that if the briquettes may be closely grouped together and sufficient draft provided therethrough, a minimal amount of fuel and absorbive material is required for igniting the said charcoal briquettes. Further, if this grouping together of briquettes may be accomplished directly on the grate or the pan of the charcoaler, then the spreading of the ignited charcoals becomes a relatively simple operation. Also, it is extremely helpful if during the ignition process the charcoal briquettes may be periodically checked to make sure that they are fully ignited before being deposited on the grate or in the pan of the charcoaler.

The present invention provides a novel charcoal starting device for the kindling of untreated charcoals and comprises a hollow kindling container having a removable chimney on the upper porton thereof for creating a sufficient draft upwardly through the container for providing sufficient oxygen to maintain ignition of the charcoal briquettes. An air inlet means is provided around the bottom of the container so that air may be drawn up through the briquettes to sustain combustion thereof. A disposable fuel saturated pad such as a cotton ball may be placed within the container and ignited. Untreated charcoal briquettes may then be poured into the container on top of the burning saturated pad. When the chimney is placed on the container, air flow across the top of the said chimeny creates a draft up through the container quickly lighting the charcoal briquettes therein. The close proximity of each briquette with respect to the other helps transfer heat and sustain ignition of the briquettes and the chimney may be periodically removed to check progress of the said briquettes. After sufficient ignition of the briquettes, the kindling container may be removed along with the chimney thereby allowing the said briquettes to fall directly onto the grating or pan of the charcoaler for subsequent use thereof.

The present invention is economical and durable in construction, simple and efficient in operation.

DESCRIPTION OF THE DRAWINGS

Other and further advantageous features of the present invention will hereinafter more fully appear in connection with a detailed description of the drawings in which.

DETAILED DESCRIPTION OF THE INVENTION

Figure 3:
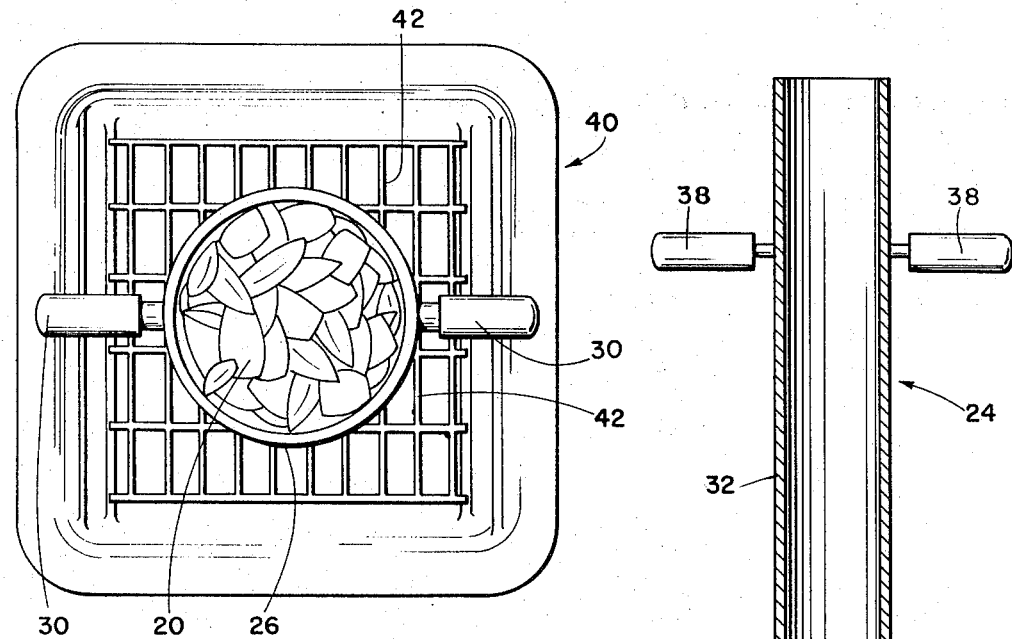
FIG. 3 is a plan view of the charcoaler and charcoal starting device of FIG. 2.

Referring to the drawings in detail, reference character 10 generally indicates a charcoal starting device being used with a pan type charcoaler generally indicated by reference character 12. The pan-type charcoaler 12 normally comprises a dish-shaped metallic pan 14 having a plurality of inwardly extending grill support members 16 around the inside periphery thereof. The pan 14 is mounted on a suitable leg support members 18 and normally relies on its flat shape to provide for sufficient air to be drawn into the pan to support combustion of the charcoal briquettes 20 being used therein.

The charcoal starter device 10 comprises a kindling chamber or container generally indicated by reference character 22 and chimney assembly or flue assembly generally indicated by reference character 24 removably secured to the top thereof. The kindling container 22 comprises a vertically disposed cylindrical shaped housing 26 which is opened at both ends thereof and is provided with a plurality of port holes 28 disposed around the lower end thereof. These bores 28 are provided for allowing air to enter the interior of the container 26 and to pass through and around the charcoals 20 deposited therein. The upper portion of the container 26 is provided with a pair of oppositely disposed outwardly extending handle members 30. These handle members should be constructed of a heat resistive material since the container 26 becomes extremely hot during the ignition and starting of the charcoal briquettes 20 therein. The handle 30 also should be located above the center of gravity of the container 22 so that the container will tend to remain vertically disposed during handling thereof.

Figure 2:
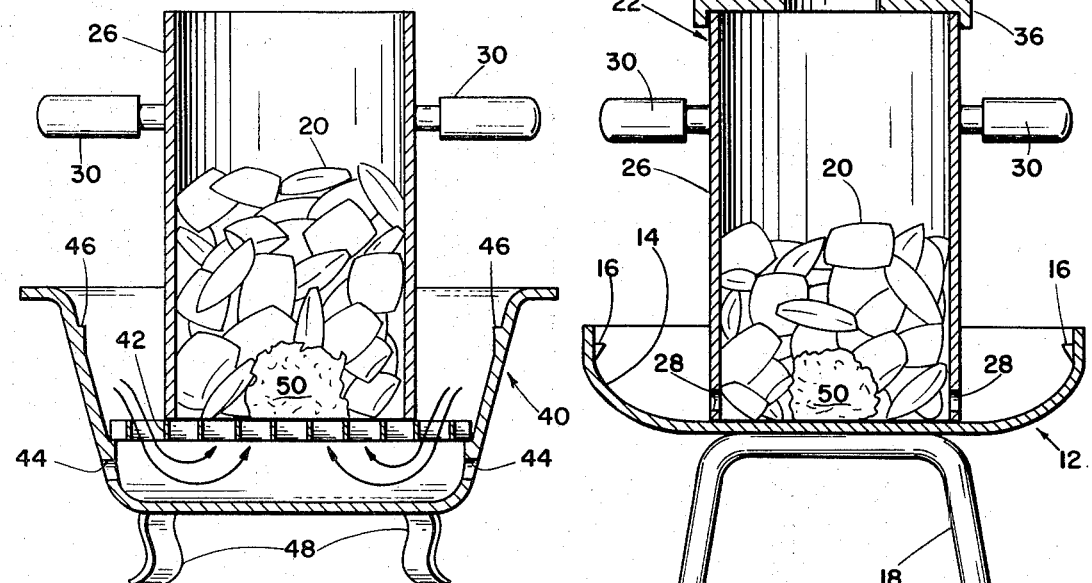
FIG. 2 is a sectional elevational view of the kindling container of the present invention resting on the grating of a charcoaler.
Figure 1:
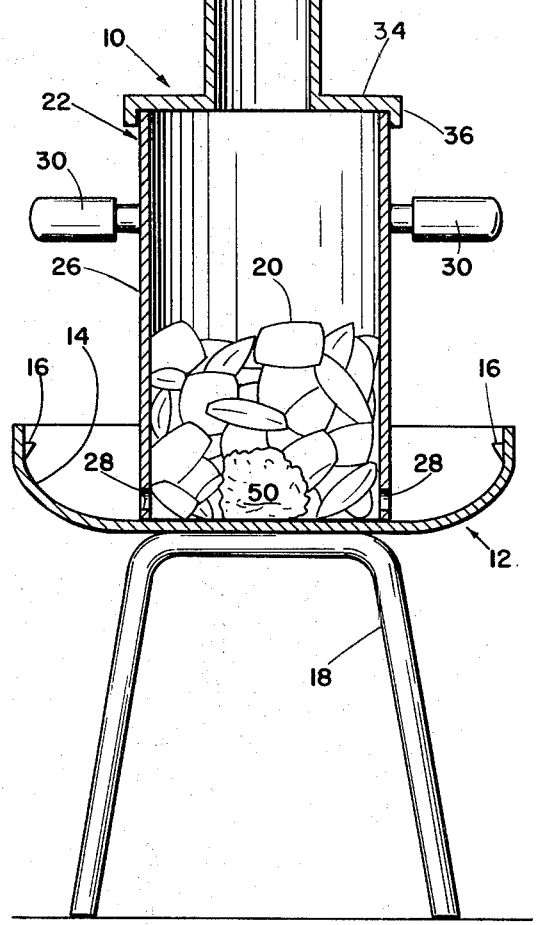
FIG. 1 is a sectional, elevational view of a charcoal starter device placed in the pan of a charcoaler and which embodies the present invention.

The flue assembly 24 generally comprises an elongated substantially long hollow tube 32 which may have substantially long hollow tube 32 which may have substantially any cross sectional shape, such as round, rectangular, or the like, and is provided at the bottom thereof with an outwardly extending flange 34 therearound. The outer edge of the flange 34 is provided with a downwardly extending annular shaped ring member 36, the inside diameter of the ring member 36 being substantially equal to the outside diameter of the container 26 for fitting snugly therearound. The upper portion of the chimney 32 is provided with a pair of oppositely disposed outwardly extending handle members 38 which may be substantially identical to the handle members 30 for the container 26. These handle members 38 may be disposed at any comfortable height, so long as they are positioned above the center of gravity for the flue assembly 24 so that said flue assembly 24 will maintain a vertically disposed orientation when being removed or installed on the container 26. Referring now to FIGS. 2 and 3, reference character 40 generally indicates a Hibachi pot type charcoaler having a horizontally disposed grating member 42 provided for the charcoals to rest thereon while being used. Normally, this type of charcoaler is provided with at least one air inlet port 44 around the lower portion thereof to admit air into the pot beneath the grating 42. Like the charcoaler pan 14, the pot 40 is provided with a plurality of inwardly extending grill support members 46 around the upper inside surface thereof and is provided with suitable leg support means 48 at the bottom thereof.

The kindling container 22 and associated flue assembly 24 may be utilized with the Hibachi pot 40 but in this case it is unnecessary to provide the kindling container 26 with the plurality of holes 28 as in the case where the said container rests directly on the bottom pan of the charcoaler. In the case of the Hibachi pot or grating-type charcoaler 40, sufficient air may be introduced through the edges of the grating or through the air inlet ports 44 as hereinabefore described.

In operation, when it is desired to start a charcoal fire in a charcoaler, the kindling container 26 is placed directly on the pan 14 of the charcoaler 12 or directly on the grating 42 of the charcoaler 40. A small piece of absorbative material 50 is presoaked in fuel such as readily available charcoal starter fuel and placed in the bottom of the container 26 directly on the pan 14 or the grating 42. This absorbative material is then ignited by a match or the like and charcoal briquettes 20 are poured over and around the material 50 which is burning. Since the lower portion of the container 26 is open, some of the charcoals will rest directly on the grating and the others will be simply supported by the bottom layer of charcoal briquettes or the absorbative material 50. The flue assembly 24 is then placed on top of the container 26 to facilitate providing a draft of air through the air inlet means which in the case of the container 26 for the charcoaler 12 is the plurality of port holes 28 around the lower periphery thereof, whereas in the case of the container 26 for the charcoaler 40, the air inlet means comprises simply the bottom open portion of the container resting on the grating 42 thereof. Any air passing across the top of the flue 32 will then create a vacuum or draft, thereby pulling the air which is introduced at the bottom of the container 26 upwardly through and around the charcoal briquettes 20 and the flaming absorbative material 50. As hereinbefore set forth, the close proximity of the charcoal briquettes in their bunched or piled configuration will serve to transmit and exchange heat therebetween causing rapid ignition of the charcoal briquettes, this ignition being made even more rapid by the constant and strong flow of air through and around the charcoal briquettes.

While the charcoal briquettes are being ignited, the flue assembly 24 may be easily removed by use of the handle means 38 to periodically check the progress of the briquettes being ignited therein. After the briquettes are sufficiently ignited for cooking therewith, the flue assembly 24 may be removed and then the kindling container 26 is removed by means of the handle members 30 by simply lifting the said container means upwardly off and away from the charcoal briquettes 20. Since the briquettes 20 are piled within the container 26 they will readily fall into their cooking position on the bottom of the pan 14 in case of the charcoaler 12 or on the grating 42 of the charcoaler 40.

It is readily apparent that the kindling container 26 hereinbefore described may be constructed with substantially suitable cross sectional shape and has been described herein as tubular or cylindrical for ease of description.

From the foregoing, it is apparent that the present invention provides a novel charcoal starting device which is particularly useful in saving fuel and time in starting a charcoal fire. The present invention provides an efficient means for creating an air draft for supporting combustion of the charcoal briquettes therein and is provided with facilities for periodic inspection of the progress of the charcoal briquettes while accomplishing all of this with the charcoals resting directly on the pan or grating from which they will be used for cooking.

Whereas, the present invention has been described in particular relation to the drawings attached hereto, other and further modifications apart from those shown or suggested herein may be within the spirit and scope of this invention.

What is claimed is:

1. A charcoal starting device for igniting untreated charcoal briquettes and comprising a kindling container for receiving kindling material and untreated charcoal briquettes prior to kindling thereof, said container being adapted for removably setting directly on the grating or pan of a charcoaler and containing the briquettes in close relationship to each other, means for allowing outside air into the lower portion of said kindling container, an elongated flue member removably attachable to the upper portion of said kindling container for facilitating the creation of an air draft through the said charcoal starting device, means for removing the kindling container after the briquettes have ignited thereby deposting said lighted briquettes on the grating or pan for immediate use.

2. A charcoal starting device as set forth in claim 1 wherein kindling container comprises a hollow elongated container having substantially vertical side walls and both ends open and a means for allowing air into the lower portion thereof comprising a plurality of spaced holes located around the lower end thereof.

3. A charcoal starting device as set forth in claim 1 wherein the means for removing the kindling container from the charcoaler comprises a pair of oppositely disposed outwardly extending handle members secured to the kindling container above the center of gravity of the said kindling container, said handling members being constructed of heat resistant material.

4. A charcoal starting device for igniting untreated charcoal briquettes and comprising a kindling container for receiving kindling material and untreated charcoal briquettes prior to kindling thereof, said container being adapted for removably setting directly on the grating or pan of a charcoaler, means for allowing outside air into the lower portion of said kindling container, an elongated flue member removably attachable to the upper portion of said kindling container for facilitating the creation of an air draft through the said charcoal starting device, means for removing the kindling container after the briquettes have ignited leaving said lighted briquettes deposited on the grating or pan for immediate use, wherein the flue member comprises an elongated vertically disposed pipe section having a cross-sectional area less than that of the kindling container and an outwardly extending flange member secured to the lower end of the pipe section, said flange member having a shape conforming to the cross-sectional shape of the upper end of the kindling container.

5. A charcoal starting device as set forth in claim 4 wherein the pipe section is provided with handle means secured thereto, said handle means being disposed above the center of gravity of the pipe section and combined flange member, said handle means being constructed of heat resistant material.

6. A charcoal starting device for igniting untreated charcoal briquettes and comprising a kindling container for receiving kindling material and untreated charcoal briquettes prior to kindling thereof, said container being adapted for removably setting directly on the grating or pan of a charcoaler, means for allowing outside air into the lower portion of said kindling container, an elongated flue member removably attachable to the upper portion of said kindling container for facilitating the creation of an air draft through the said charcoal starting device, means for removing the kindling container after the briquettes have ignited leaving said lighted briquettes deposited on the grating or pan for immediate use, wherein the kindling container comprises an elongated vertically disposed cylindrical tube section having both ends opened and having means for allowing outside air into the lower portion thereof and a pair of oppositely disposed outwardly extending handle members secured to the upper portion thereof and wherein the flue member comprises an elongated vertically disposed tube section having a cross-sectional area less than that of the kindling container and an outwardly extending circular shaped flange member secured to the lower end of the tube section the diameter of the flange member being substantially equal to the outside diameter of the kindling container, means for removably fitting said flange member to the top of the kindling container and a pair of oppositely disposed outwardly extending flue handle members secured to the upper portion of the tube section.

\* \* \* \* \*